United States Patent [19]

Dewald

[11] Patent Number: 4,976,210

[45] Date of Patent: Dec. 11, 1990

[54] METHOD AND APPARATUS FOR TREATING HAZARDOUS WASTE MATERIALS

[76] Inventor: Jack J. Dewald, 7323 W. Roadway, New Orleans, La. 70124

[21] Appl. No.: 502,516

[22] Filed: Mar. 29, 1990

[51] Int. Cl.[5] ........................ A47J 36/00; A47J 36/24

[52] U.S. Cl. .................................... 110/246; 110/215; 110/226

[58] Field of Search ................ 110/226, 246, 346, 215

[56] References Cited

U.S. PATENT DOCUMENTS 2,978,998 4/1961 Frankland .......................... 110/215

3,788,244 1/1974 Polsak et al. ........................ 110/215

3,842,762 10/1974 Sargent et al. .................. 110/246 X 3,848,548 11/1974 Bolejack, Jr. et al. ......... 110/215 X

*Primary Examiner*—Edward G. Favors

*Attorney, Agent, or Firm*—Pravel, Gambrell, Hewitt, Kimball & Krieger

[57] ABSTRACT

A hazardous waste disposal system includes a rotary kiln heated with an atomizing burner which mixes fuel such as diesel oil with air and injects the burning mixture into the kiln. An afterburner section is similarly fueled with an atomizing burner. An upstanding scrubber receives exit gases and removes particulate matter using water spray across multiple frusto conical shaped baffles on increasing diameter. Cyclone vanes produce a spinning effect to the exit gases during scrubbing.

25 Claims, 7 Drawing Sheets

METHOD AND APPARATUS FOR TREATING HAZARDOUS WASTE MATERIALS

BACKGROUND OF THE INVENTION

1. Field of the Invention

The present invention relates to a multi-stage system for treating hazardous wastes such as oil well drilling waste material, wherein a high efficiency multi-stage incinerator includes a rotary kiln stage fired by a venturi shrouded burner having controlled inflow of burner fuel and air flow, with an upstanding generally vertical scrubbers that is fired at its lower end by one or more secondary burners, and with vertically spaced water sprayers and cone shaped annular baffles treating the gases produced from combustion with a high surface area of dispersed water droplets.

2. General Background

Rotary kilns and incinerators have been commercially available and used in the treatment of various types of waste including municipal waste, industrial waste, and hazardous waste. Hazardous waste is often contained in open pits or pools. These pits can contain oil, oil drilling wastes, and complex mixtures of hazardous material such as refining refuse and/or plural refinery chemical discharges.

In order to "treat" these open pit hazardous waste products, simple burning has been used in the past. Open pit burning is a highly inefficient and undesirable method of disposing of hazardous waste in pits because of the fact that incomplete combustion scatters soot over a large area, polluting the surrounding area. The settling soot creates a further pollution problem for ground water.

In order to completely decompose hazardous waste, municipal waste, and industrial waste, a high temperature, highly efficient combustion can be utilized. The gaseous discharge of this combustion can be scrubbed so that the gaseous output does not contain polluted or hazardous particulate material or gaseous material which might be an additional source of pollution even after combustion of the initial hazardous waste product. A problem often encountered with the treatment of hazardous waste is that it must be able to handle high product loading rates. Open pits can contain thousands of barrels of waste material that must be incinerated quickly.

Various patents have issued relating to various rotary kiln constructions. Indeed, rotary kilns per se are commercially available. An example of a rotary kiln can be seen in the recently issued U.S. Pat. No. 4,730,564 entitled "Multi-Staged Kiln" issued to Harry Abboud. The Abboud patent discloses a multi-stage rotary kiln for burning waste, suitably skid mounted for easier transport. The kiln includes a pair of concentric tubes affixed one inside the other and rotatable, a first large diameter tube and a second tube of small diameter provided at one end with circumferential wall openings mounted inside the first large diameter tube. An annular passageway between the two tubes is provided and an opening through the second small diameter tube provides a continuous flow path for introducing waste and the hot burning gases. The hot gases flowing concurrently with the waste via the annular passageway and the circumferential openings into and through the second tube. The feed mechanism introduces waste into the annular passageway and an elevator lifts the burning waste from the annular passageway and passes the same into the circumferential openings and the burning waste is transported through the smaller tube and discharged.

Other patents that relate generally to the incineration of waste material using rotary kiln can be seen in the Angelo U.S. Pat. No. 4,734,166 entitled "Furnace For the Selective Incineration Or Carbonization Of Waste Materials"; the Reed et al., U.S. Pat. No. 4,724,777 entitled "Apparatus For Combustion of Diverse Materials And Heat Utilization"; the Bolle U.S. Pat. No. 3,882,801 entitled "Incinerator For Domestic And Industrial Solid, Semi-Liquid Or Liquid Waste"; and the Jaronko U.S. Pat. Nos. 3,906,874 and 3,938,450 entitled "Mobile Furnace Vehicle".

The concept of using a scrubber to treat the gaseous discharge of incineration is disclosed generally in several patents including for example the Marchand U.S. Pat. No. 4,704,972 entitled "Method And Apparatus For Reducing Acid Pollutants In Smoke"; Warner U.S. Pat. No. 4,557,202 entitled "Exhaust Gas Treatment Method And Apparatus"; the Caffyn et al U.S. Pat. No. 4,424,755, entitled "Incineration System Having Cyclonic Oxidation Chamber"; the Celis U.S. Pat. No. 4,392,875 entitled "Smog Eliminator"; the YaGuchi et al U.S. Pat. No. 4,269,806 entitled "Scrubber For Removal of Sulphur Dioxide From Exhaust Gas"; the Spitz U.S. Pat. No. 4,162,654 entitled "Pollution Control Incineration System", the Hartman U.S. Pat. No. 4,168,958 entitled "Smokestack Air Washer", the Morales U.S. Pat. No. 4,149,901 entitled "Pollution Control And Convection Heater", the Menigat et al U.S. Pat. No. 3,921,543 entitled "Method Of Incinerating Salt Containing Liquid Sludge", the Crawley U.S. Pat. No. 3,823,531 entitled "Gas Cleaner", the Torrence U.S. Pat. No. 3,762,858 entitled "High Temperature Scrap Cleaning Conveyor", the Smuck U.S. Pat. No. 3,701,237 entitled "Smoke Eluminator", the Snelling U.S. Pat. No. 3,646,897 entitled "Method and Apparatus for Pollution Free Burning of Automobile Bodies"; the McClure U.S. Pat. No. 3,533,608 entitled "Smog Arrester", the Bowman U.S. Pat. No. 3,530,806 entitled "Incinerator", the Tomany et al U.S. Pat. No. 3,520,649 entitled "System of Removal of Sulphur Oxide and Fly Ash From Power Plant Flue Gases", the Ford U.S. Pat. No. 3,395,656 entitled "Fly Ash Removal Device For Incinerators", the Frankland U.S. Pat. No. 2,978,998 entitled "Incinerator", the Otto U.S. Pat. No. 2,771,281 entitled "Benzol Scrubbing Method and Apparatus"; the Kameya U.S. Pat. No. 2,709,580 entitled "Smoke Washer"; and the Durant U.S. Pat. No. 999,213 entitled "Apparatus For Bringing a Gas Into Contact With A Liquid".

In the Kameya '580 patent there is disclosed a smokestack of preferably cylindrical shape having dished, annular plates disposed one above the other supported by struts. A hollow spray head of substantially hemispherical shape is mounted on the upper convex side of one of the plates and centrally of the plate with a plurality of spray nozzles projecting radially from the spray head at equal angular intervals therein and are directed toward the outer edge of one of the plates for directing sprays of water over the outer edges of the plates and causing the water to flow downwardly over the outer edges of a successfully lower plates and over the outer edge of the bottom into the bottom annular trough.

Applicant herein is the named inventor of a prior U.S. Pat. No. 3,807,932 directed to a burner construction that incorporates a burning head mounted within a venturi shape shroud. Atomizing is accomplished using fluid that is mixed with the burner fuel.

The present invention provides an improvement over these prior art patents by disclosing a new, improved combination that includes the use of first and second burners positioned respectively at the intake of the rotary kiln and at the bottom of the scrubber portion adjacent the discharge from the rotary kiln. Each of the burners is preferably of an atomizing type, having a burning head mounted internally of a venturi shaped shroud, the burner receiving controlled flow of both air and liquid fuel such as low cost diesel fuel so that the flow of fuel for burning and the flow of air through the venturi can be controlled at both the primary and at the secondary burners to produce a highly efficient burn. Particulate matter leaving the bottom end portion of the scrubber stack is cleansed of any minute or particulate material that might not be completely burned during combustion.

SUMMARY OF THE PRESENT INVENTION

The present invention thus provides an improved hazardous waste disposal system that includes a rotary kiln and a burner for transferring intense heat to the interior of the kiln. A material feed is provided for adding hazardous material to the kiln on a batch or continuous basis and a generally upstanding, vertical scrubber stack is provided for receiving gaseous solid material discharge from the kiln.

A plurality of vertically stacked spray heads are positioned within the scrubber stack together with a plurality of concentric annular vertically stacked cones disposed within the stack and respectively with each of the spray heads.

The spray heads are positioned to spray fluid onto the plurality of cones so that the water cascades from one cone to the next and the flow of gaseous material discharged from the kiln proceeds generally upwardly in the scrubber stack at least some of the gaseous material flowing between the cones.

In the preferred embodiment, the primary and secondary burners are each atomizing type burners, which mix air and fuel in an atomizing fashion, each burner being preferably surrounded with a venturi shaped shroud to enhance air flow to the flame.

In the preferred embodiment, the material feed can include a hydraulic ram for forcing heavy hazardous material into the kiln.

In the preferred embodiment, the secondary burner is positioned at the lower end portion of the scrubber stack, below the spray heads.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
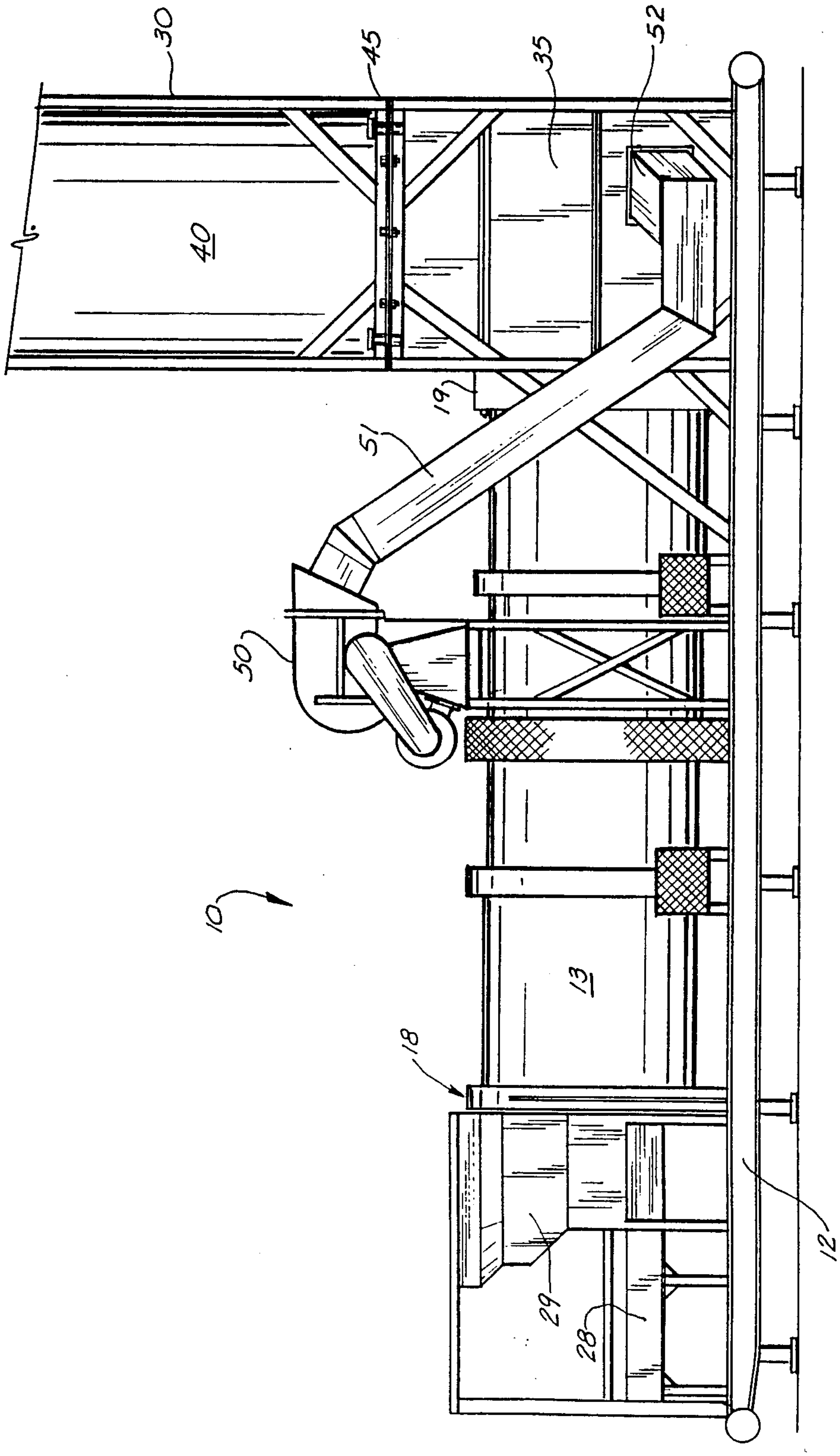
FIG. 1 is a sectional elevation view of the preferred embodiment of the apparatus of the present invention.
Figure 2:
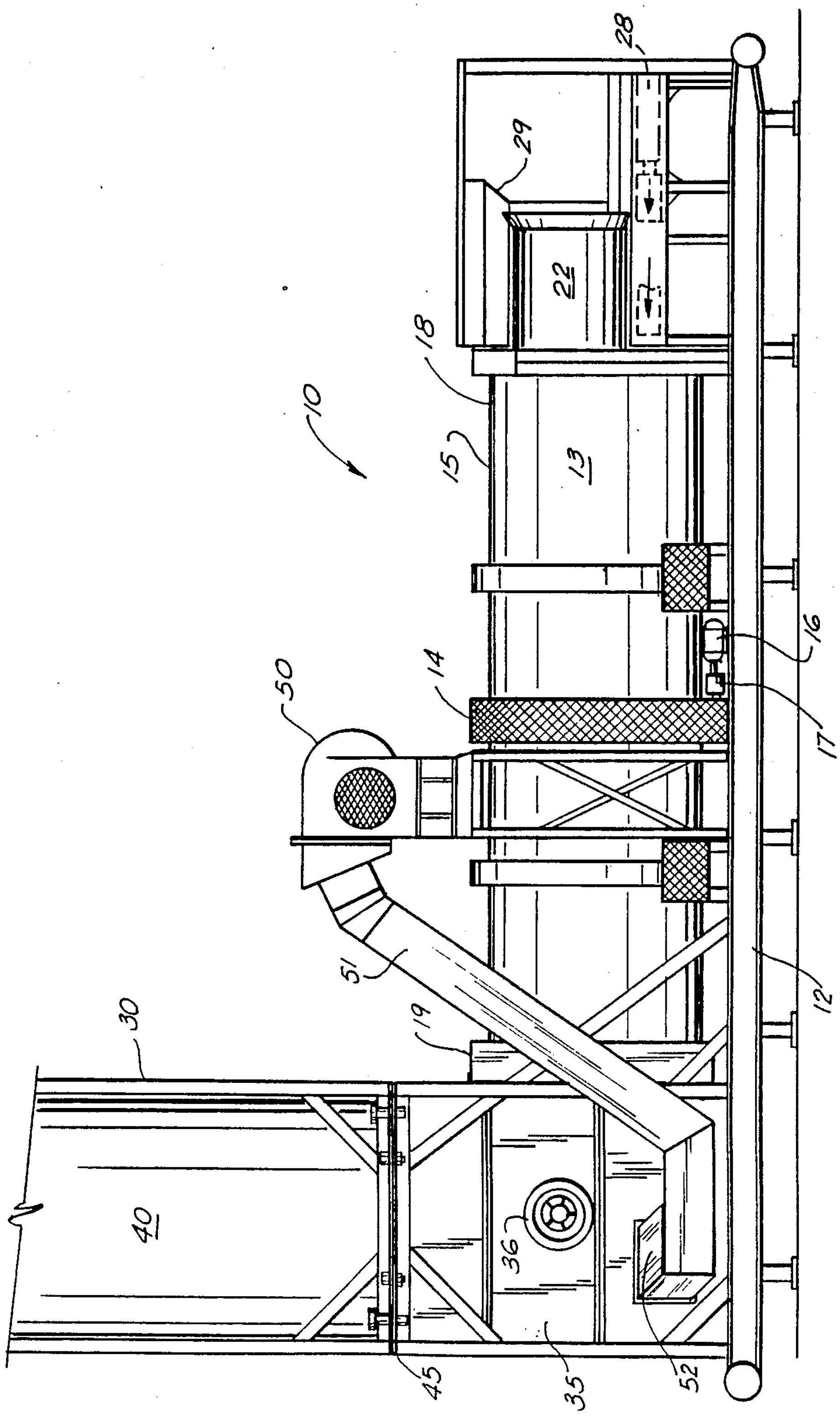
FIG. 2 is a side, partial elevational view of the preferred embodiment of the apparatus of the present invention.

FIGS. 1 and 2 illustrate generally the preferred embodiment of the apparatus of the present invention designated generally by the numeral 10. In FIGURE 1, there can be seen a sled or skid 12 of structural steel, for example, that supports rotary kiln 13 thereon. Rotary kiln 13 is basically a commerically available, generally cylindrical rotary kiln having an external gear 14 mounted circumferentially about the outer wall 15 of the kiln 13 and driven by variable speed motor 16 preferably powering gear drive 17 which intermeshes with gear 14. Kiln 13 provides an intake 18 end portion and a discharge 19 end portion. The axis of rotation of the kiln is inclined so that the intake 18 is higher than the discharge 19. In this manner of operation, the kiln 13 will gradually convey waste material to be burned from the intake 18 to the discharge 19.

Figure 3B:
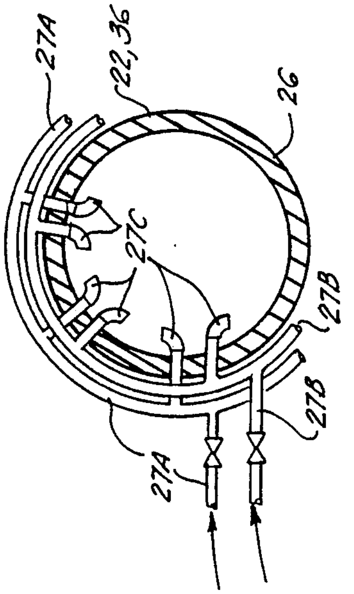
FIGS. 3, 3A and 3B are a partial cutaway view of the preferred embodiment of the apparatus of the present invention.
Figure 3A:
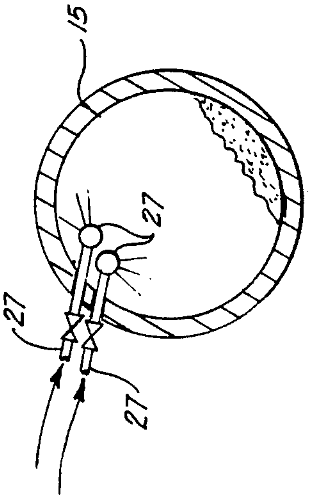
Figure 3:
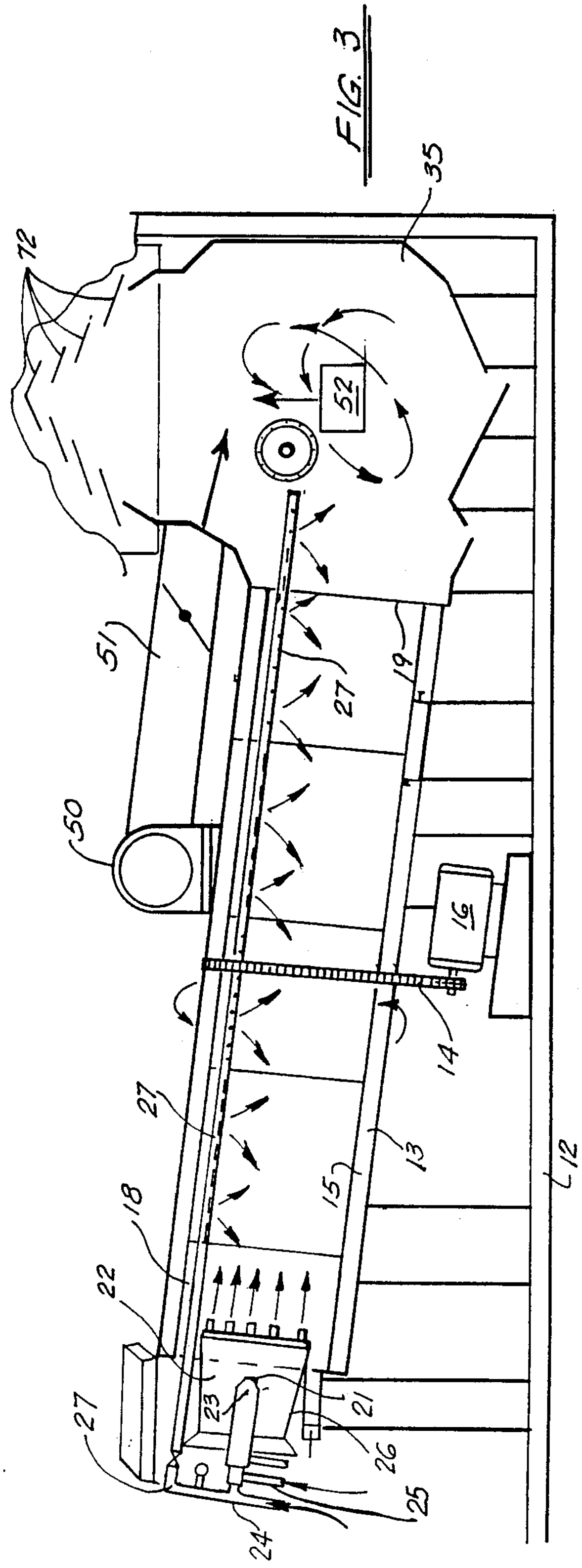

Burner 22 transfers intense heat to kiln 13 interior, and is preferably an atomizing type burner having a burner head 23 which receives air flow via line 24 and fuel such as diesel oil or the like via line 25 and atomizes that mixture at nozzle 21 to produce a burn. The burner head 23 (FIGS. 3 and 6), is mounted within a generally annular venturi shaped shroud 26. A pair of longitudinally extending perforated air lines 27 convey air from line 24 to and along the full length of kiln 13. The air lines can direct air in opposite directions by alternating placement of the perforations. Air can also be routed to circumferential perforated rings 27A, 27B to elbows 27C, as shown in FIG. 3B, so that air can be added to the burn immediately downstream of shroud 26. The construction and operation of burner 22 can be seen for example in U.S. Pat. No. 3,807,932 issued to Applicant herein Jack Dewald, and incorporated herein by reference.

Hydraulic ram 28 receives bulk material via hopper 29 such as heavy solid hazardous waste material to be burned. Alternatively, material can be supplied via a flow line (not shown) and pumped into the intake 18 of kiln.

Figure 4:
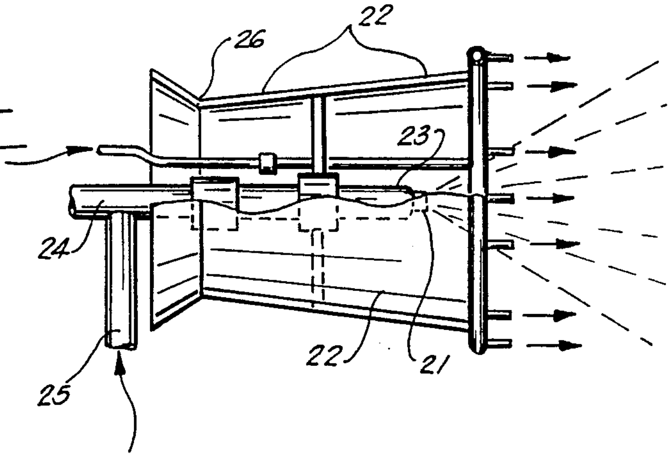
FIG. 4 is a fragmentary view of the preferred embodiment of the apparatus of the present invention.
Figure 5:
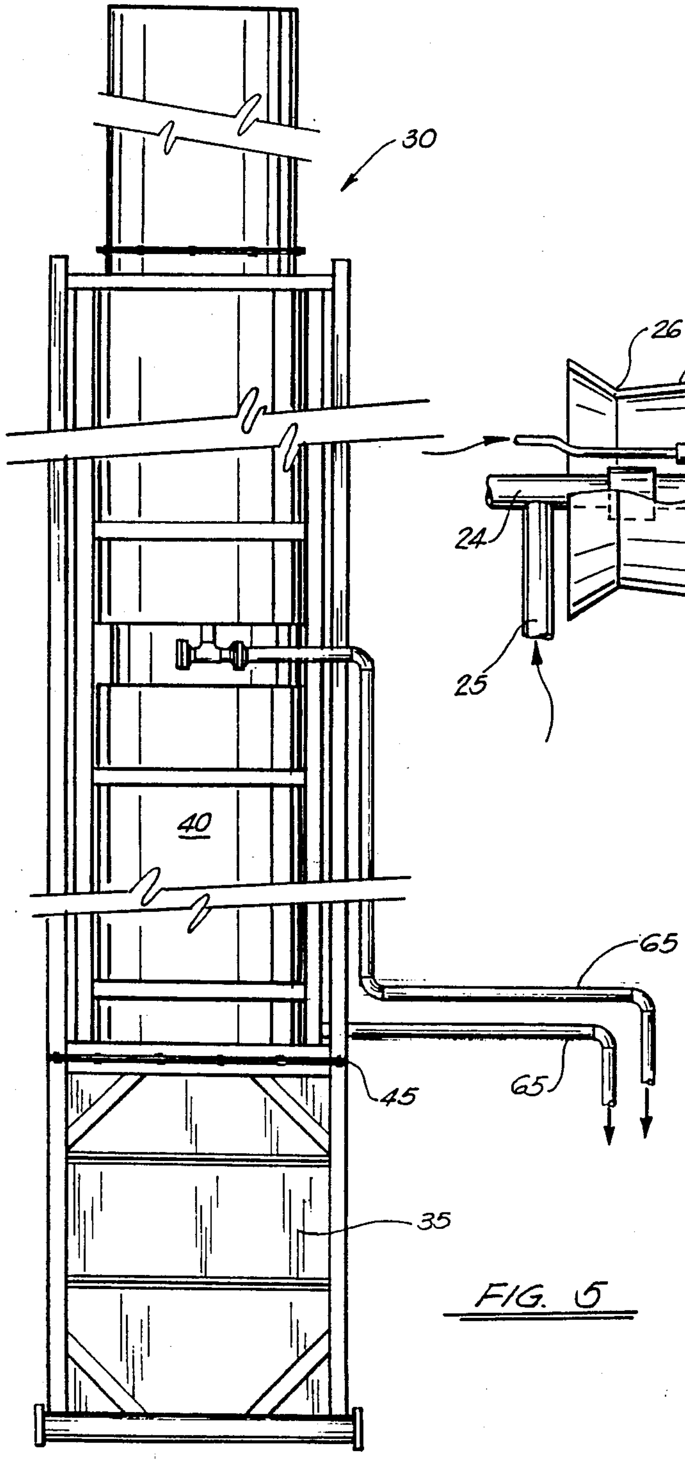
FIG. 5 is a fragmentary elevational view of the preferred embodiment of the apparatus of the present invention illustrating the scrubber stack portion thereof.

Vertical tower 30 as can best be seen in FIGS. 1-2 and 5-6 includes secondary burner chamber 35 and scrubber 40. Blower 50 forces air into secondary burner or afterburner chamber 35 via left and right ducts 51 and into the lower end portion 41 of scrubber 40 at left and right inlets 52. Scrubber 40 is an elongated generally upstanding vertical structure having lower 41 and upper 42 end portions with a hollow interior 43 that communicates with secondary burner chamber 35. One or more secondary burners 36 communicate with secondary burner chamber 35. Each secondary burner 36 is preferably a venturi shaped burner that atomizes fuel such as diesel oil during use. Secondary burners 36 are thus similar in construction and operation to burner 22, as shown in FIGS. 3B and 4.

Disposed within the interior 43 of scrubber stack 40 are a plurality of liquid spray manifold assemblies 60, 62, 64, 66, each being connected to influent flow line 61 for conveying water as illustrated by the arrows 67 to the scrubber 43 interior. Each spray manifold assembly 60, 62, 64, 66 is fitted with a plurality of adjustable liquid nozzles (13 preferred) positioned to spray water against the outer walls to totally saturate the exhaust gases. Water that splashes off the scrubber walls, and condenses on the upper cones and demister vanes fall upon a plurality of cones or conically shaped baffles 70–72 (FIGS. 6–10) including a first upper plurality 70, a second middle plurality 71, and a third lowermost plurality 72. Each plurality of baffles 70–72 includes cones of gradually increasing diameter beginning with a smaller diameter uppermost cone and ending with a lower larger diameter cone, and cascade off the cones into reservoirs 68 and 69.

Figure 6:
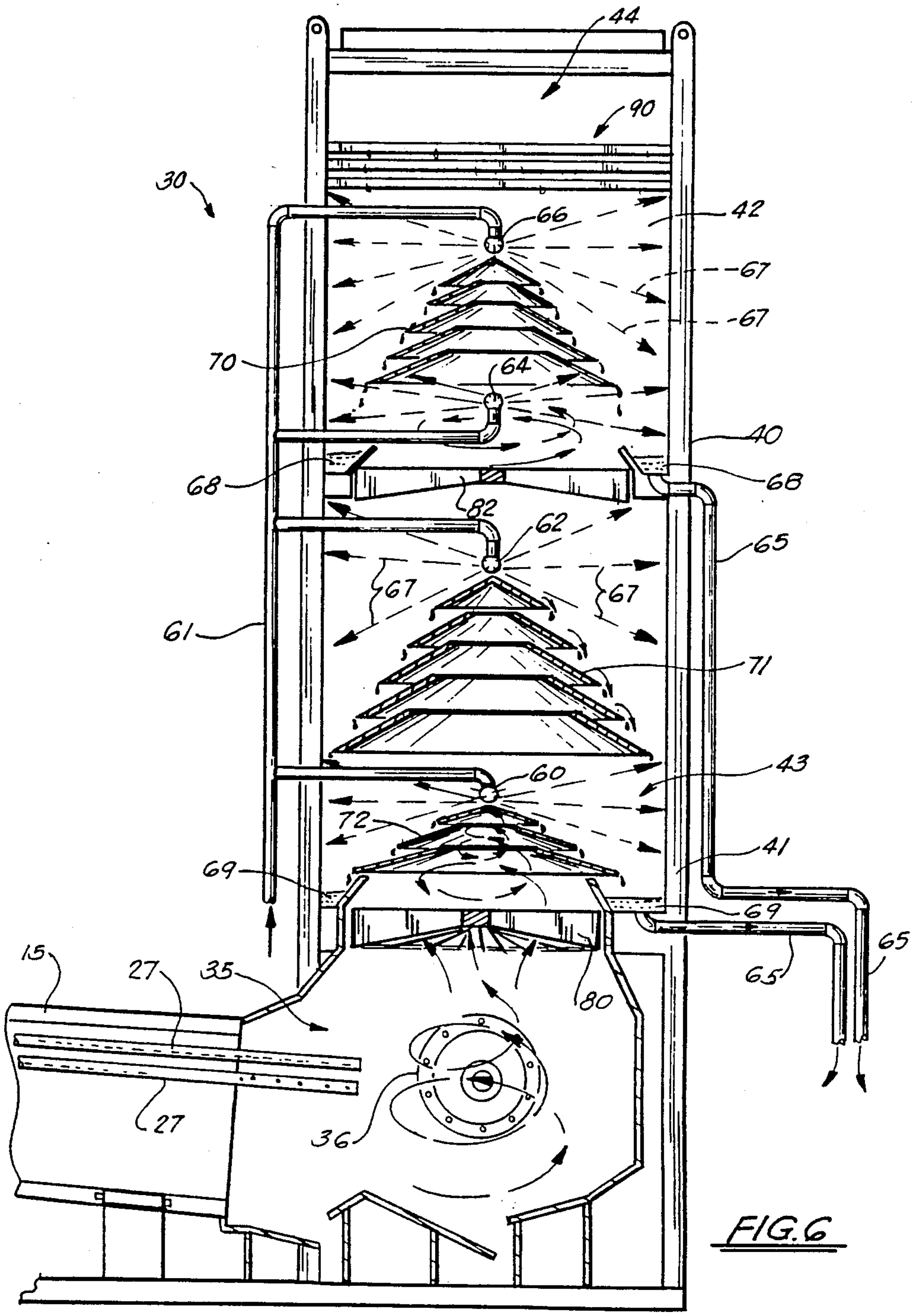
FIG. 6 is a sectional elevational fragmentary view of the preferred embodiment of the apparatus of the present invention.
Figure 7:
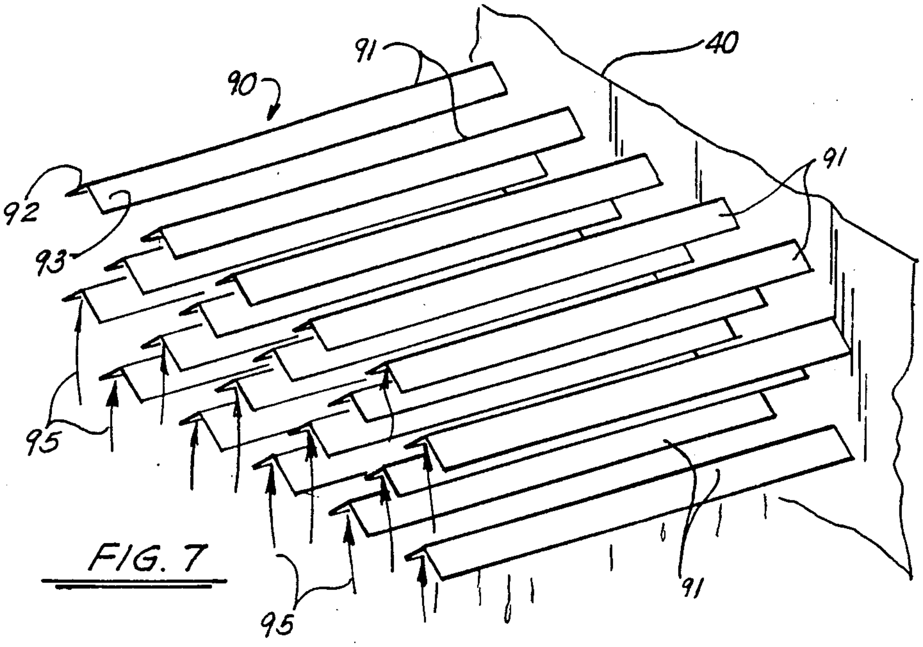
FIG. 7 is a fragmentary view of the preferred embodiment of the apparatus of the present invention illustrating the demisters.
Figure 8:
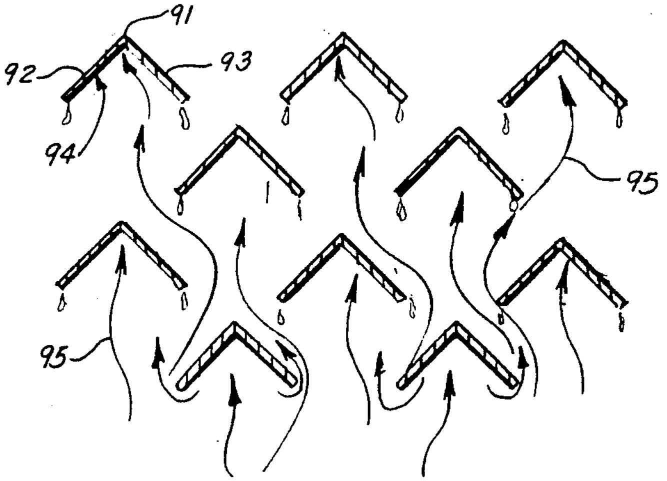
FIG. 8 is a fragmentary side sectional view of the preferred embodiment of the apparatus of the present invention illustrating the demisters.
Figure 9:
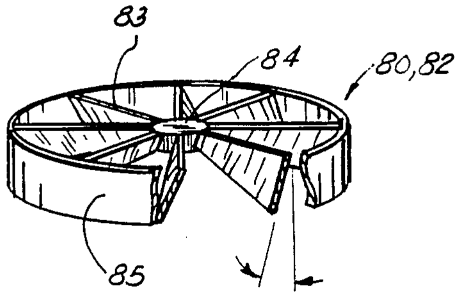
FIG. 9 is a fragmentary cutaway view of the preferred embodiment of the apparatus of the present invention illustrating the cyclone vane portion thereof.
Figure 10:
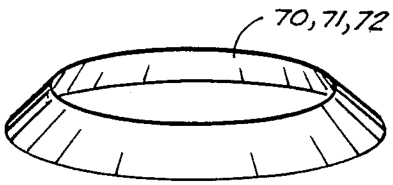
FIG. 10 is a fragmentary perspective view of the preferred embodiment of the apparatus of the present invention illustrating one of the scrubber cones.

Spray manifolds 62 and 64 are positioned generally above the plurality of baffles 71, as shown in FIG. 6. The spray manifolds 60, 62, 64, 66 are positioned to spray water against the outer scrubber walls and bounce back upon the surface of each of the plurality of baffles 70–72 allowing water to cascade downwardly so that some of the air flow upwardly within the interior 43 of scrubber 40 proceeds between cone members and is scrubbed of particulate matter by the cascading water. Reservoirs 68, 69 catch water that is discharged from baffles cones 70–72 for collection by effluent flow lines 65.

As air is forced into secondary chamber 35, it rises upwardly within the interior 43 of scrubber 40. A pair of spaced apart, static cyclone vanes 80, 82 are positioned vertically apart within scrubber 40 interior 43. Vanes 80, 82 are shown more particularly in FIG. 9, each cyclone vane including a plurality of inclined, radial vanes 83 attached to a central hub 84 and supported at their periphery by an annular, cylindrical outer wall 85. The cyclone vanes 80, 82 impart a rotational flow to air rising upwardly within the interior 43 of scrubber 40.

Demister 90 includes a plurality of elongated members 91, each being generally V shaped in cross section, having flanges 92, 93 which are approximately 90° with respect to one another, forming an underside 94 that is in the form of an inverted V. Arrows 95 indicate the flow of gaseous material between the members 91 in FIGS. 7 and 8. Mist and moisture contained within the air exiting the top section 42 of scrubber 40 collects upon the undersurface 94 and drips downwardly so that minimal liquid material exits the scrubber 40.

Figure 11:
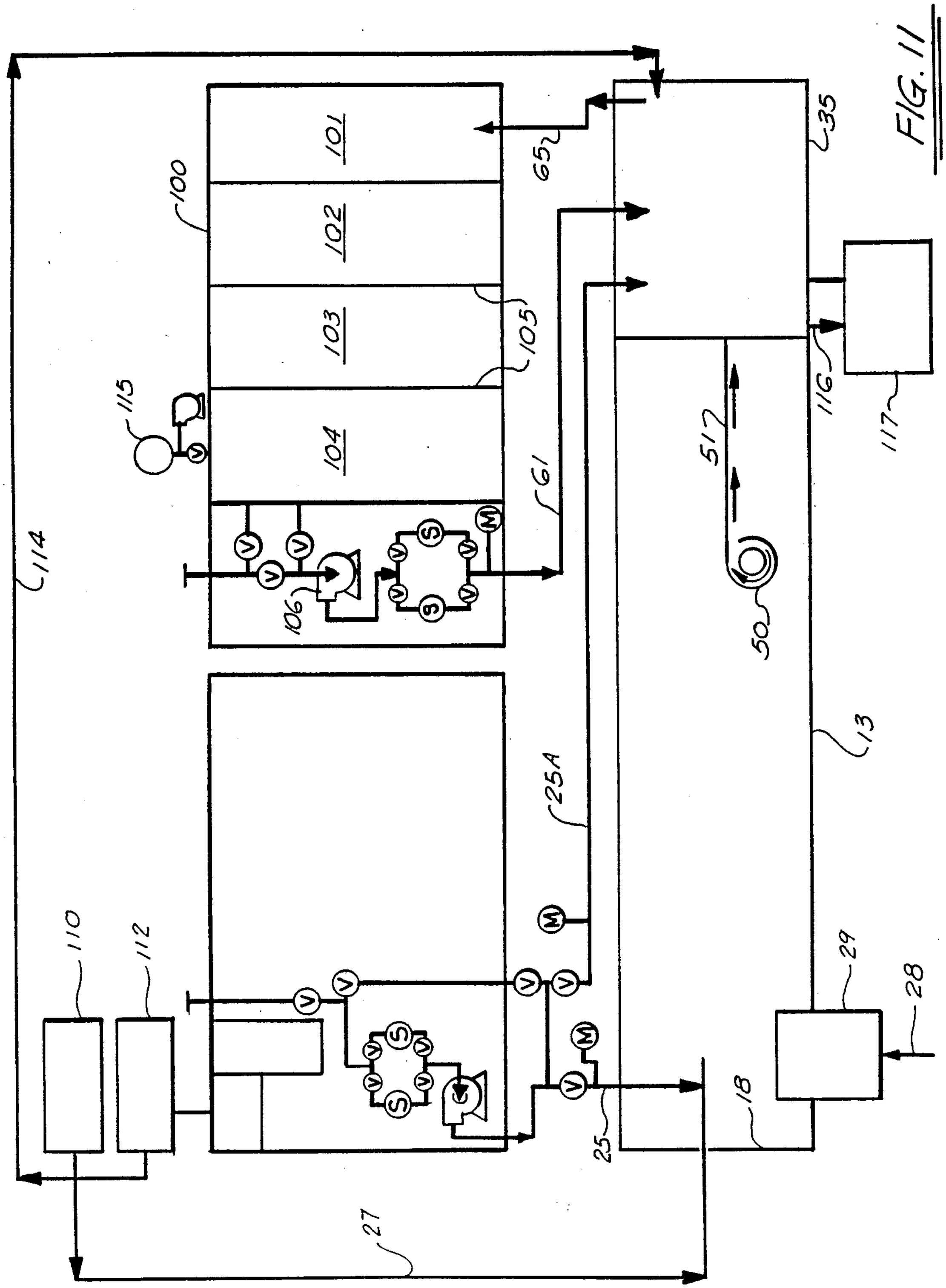
FIG. 11 is a schematic view of the preferred embodiment of the apparatus of the present invention.

In FIG. 11, a flow chart illustrates the recirculation of solid material which is contained in the effluent flow stream 65, as well as the injection of fuel to the primary burner 22 and the secondary burners 35. Settling basin 100, provides a plurality of separate sections 101–104 defined by a plurality of transverse baffles 105. Each section 101–104 is "cleaner" than the previous, as solids gradually settle out. Settleable solids can be incinerated at burner 22 and kiln 13. Pump 106 transfers water via line 61 back to scrubber 40. A pair of air compressors 110, 112 supply air via line 27 to burner 22 and via line 114 to secondary burners 36 which interface with secondary or after burner section 35. Burner 22 and after burners 36 are supplied with fuel via lines 25 and 25A respectively. Chemical treatment tank 115 can be used to add water treatment chemicals to settling tank 100. Solid ash disposal from kiln 13 and afterburner 35 is via line 116 to ash disposal tank 117

The above-described apparatus has been successfully tested with regard to emissions data. The following are emissions data collected from the Portable Rotary Kiln Combustion System during testing. Particulate concentration data, grain/DSCF, have been corrected to 7% oxygen. All other data, including particulate emission rate data, lb/hr, are reported without the oxygen correction.

Also presented are results of metals analysis on the slurry water, incinerator ash, and waste oil samples collected during the compliance tests.

CYCLONE RECYCLE CORPORATION
PORTABLE ROTARY KILN COMBUSTION SYSTEM

| PARAMETER | RUN 1 | RUN 2 | RUN 3 | AVG. | DEQ VARIANCE LIMITS |
|---|---|---|---|---|---|
| DATE | 2-1-90 | 2-1-90 | 2-2-90 | | |
| TIME | 1839–2029 | 2211–2357 | 154–339 | | |
| PARTICULATE - * | | | | | |
| (grain/DSCF) | 0.05517 | 0.01997 | 0.03589 | 0.03701 | — |
| (lb/hr) | 2.504 | 0.934 | 1.629 | 1.689 | 4.60 |
| SULFUR DIOXIDE (lb/hr) | 2.222 | 3.729 | 3.105 | 3.109 | 6.74 |
| OXIDES OF NITROGEN (lb/hr) | 2.910 | 3.080 | 2.967 | 2.986 | 8.875 |
| CARBON MONOXIDE (lb/hr) | 0.283 | 0.190 | 0.115 | 0.196 | 2.67 |
| TOTAL HYDROCARBONS (lb/hr) | 2.104 | 1.670 | 1.017 | 1.597 | 3.59 |
| OXYGEN (test monitor, %) | 11.25 | 11.28 | 11.06 | 11.20 | — |
| STACK GAS DATA | | | | | |
| TEMPERATURE, F. | 175 | 174 | 180 | 176 | |
| MOISTURE, % | 32.99 | 33.15 | 35.71 | 33.95 | |
| VELOCITY, ft/sec | 4.51 | 4.67 | 4.56 | 4.58 | |
| VOLUMETRIC FLOW, | | | | | |

-continued

| CYCLONE RECYCLE CORPORATION PORTABLE ROTARY KILN COMBUSTION SYSTEM | | | | | |
|---|---|---|---|---|---|
| PARAMETER | RUN 1 | RUN 2 | RUN 3 | AVG. | DEQ VARIANCE LIMITS |
| ACFM | 13815.8 | 14303.2 | 13962.1 | 14027.0 | |
| DSCFM | 7724.5 | 7984.5 | 7436.1 | 7715.0 | |

* - Percent of isokinetic sampling during particulate emission determination is; Run 1- 93.88%, Run 2- 101.81%, Run 3- 107.51%.

CYCLONE RECYCLE CORPORATION
PORTABLE ROTARY KILN COMBUSTION SYSTEM
METALS ANALYSIS

| METAL | FEED MATERIAL (mg/kg) | SLURRY WATER - (mg/l) Run 1 | Run 2 | Run 3 | INCINERATOR ASH (mg/kg) | DNR 29-B WASTE/SOIL MIXTURE LIMIT |
|---|---|---|---|---|---|---|
| Arsenic | 9.1 | 0.021 | 0.022 | 0.026 | 12 | 10 |
| Barium | 475 | 106 | 118 | 126 | 910 | 2000 |
| Cadmium | 0.85 | 0.028 | 0.047 | 0.016 | 0.82 | 10 |
| Chromium | 5.6 | 0.08 | 0.09 | 0.08 | 25 | 500 |
| Lead | 90.5 | 0.37 | 0.33 | 0.40 | 81 | 500 |
| Mercury | 0.475 | 0.0078 | 0.0087 | 0.0075 | 6.26 | 10 |
| Selenium | ND | ND | ND | ND | ND | 10 |
| Silver | 0.075 | 0.015 | ND | ND | 0.84 | 200 |
| Zinc | 93.35 | 0.325 | 0.325 | 0.418 | 138.8 | 500 |
| Carbon content (wt %) weight loss at 550 deg C. | 5.36 | — | — | — | 0.14 | |
| pH Units | | 6.6 | 6.7 | 6.8 | | |

ND ' None detected

PROCEDURE

Emissions were determined using EPA Methods found in Appendix A, Part 60, Title 40 of the Code of Federal Regulations. A brief description of each method used follows.

METHOD 1: SAMPLE AND VELOCITY TRAVERSES FOR STATIONARY SOURCES

The Portable Rotary Kiln Combustion System has a stack diameter of 96.75 in. Samples and measurements were collected at a point 0.51 stack diameters upstream and 6.68 stack diameters downstream. Under these conditions the method requires 24 traverse points. The stack crosssection at the sampling point was divided into 24 equal areas with the sampling point located at the centroid of each area.

METHOD 2: DETERMINATION OF STACK GAS VELOCITY AND VOLUMETRIC FLOW RATE (TYPE S PITOT TUBE)

The average gas velocity in the stack was determined from the gas molecular weight, moisture content and the measurement of the average velocity head with a type "S" pitot tube. Dry volumetric flow rate was determined from the velocity and stack diameter.

METHOD 3: GAS ANALYSIS FOR CARBON DIOXIDE, OXYGEN, EXCESS AIR, AND DRY MOLECULAR WEIGHT

The dry molecular weight of the stack gas was determined using an Orsat analyzer. The Orsat measures the concentration of oxygen, carbon monoxide and carbon dioxide. The remaining gas components are assumed to be nitrogen. A gas sample was extracted from the centroid of the stack using a stainless steel probe fitted with a particulate filter. The probe, sample lines, and orsat were purged sufficiently to obtain a representative grab sample for analysis.

METHOD 3A: DETERMINATION OF OXYGEN AND CARBON DIOXIDE CONCENTRATIONS IN EMISSIONS FROM STATIONARY SOURCES

(INSTRUMENTAL ANALYZER PROCEDURE)

A gas sample was continuously extracted from the stack using a heated probe and sample line. The sample was transferred to a oxygen analyzer for analysis of oxygen concentration. Analyzer output was continuously recorded by a computer data acquisition system. Results form the oxygen monitor were used for reference purposes only and were not used to determine stack gas molecular weight.

METHOD 4: DETERMINATION OF MOISTURE CONTENT IN STACK GASES

A gas sample was extracted from the stack using a heated glass probe fitted with a particulate filter. The sample gas then passed through a series of four impingers immersed in an ice bath. The first two impingers contained measured volumes of water, the third was empty, and the fourth contained a known weight of silica gel. Any water vapor in the gas stream was condensed and trapped in the impingers. Moisture was determined gravimetrically.

METHOD 5: DETERMINATION OF PARTICULATE EMISSIONS FROM STATIONARY SOURCES

A gas sample was withdrawn isokinetically from the source using a heated probe. The gas was drawn through a heated glass fiber filter that collected particulate and any material that condensed at our above the filtration temperature. The gas then passed through an impinger train immersed in an ice bath. The train consisted of two impingers containing known amounts of water, one empty impinger, and one impinger packed with silica gel.

Sample flow rate was established using a leak free diaphragm pump and controlled using a valve. A calibrated dry gas meter was used to determine the total gas sample volume.

After sampling, the filter was recovered from the filter holder. The front half of the filter holder and probe were washed with acetone and the washings were poured into a sample bottle. Sample containers were labeled and sealed.

METHOD 6: DETERMINATION OF SULFUR DIOXIDE EMISSIONS FROM STATIONARY SOURCES

A gas sample was withdrawn isokinetically from the source using a heated probe an drawn through a heated glass fiber filter that collected particulate and any material that condensed at or above the filtration temperature. The gas then passed through an impinger train immersed i an ice bath. The train consisted of one impinger containing 3% hydrogen peroxide, and one impinger packed with silica gel. Sample flow rate was established using a leak free diaphragm pump and controlled using a valve. A calibrated dry gas meter was used to determine the total gas sample volume.

After sampling, the impinger train was purged with ambient air for 15 minutes. The contents of the first impinger was discarded and impingers 2 and 3 were collected as one sample. Sample containers were labeled and sealed.

METHOD 7E: DETERMINATION OF NITROGEN OXIDES EMISSIONS FROM STATIONARY SOURCES

A gas sample was continuously extracted from the stack at a centroidal sampling point. The sample was transferred through a heated sample line to continuous chemiluminescence analyzer for the determination of oxides of nitrogen concentration.

METHOD 10: DETERMINATION OF CARBON MONOXIDE EMISSIONS FROM STATIONARY SOURCES

A gas sample was continuously extracted from the stack at a centroidal sampling point. The sample was transferred through a heated sample line to a continuous nondispersive infrared analyzer for the determination of carbon monoxide concentration.

METHOD 25A: DETERMINATION OF TOTAL GASEOUS ORGANIC CONCENTRATION USING A FLAME IONIZATION ANALYZER

A gas sample was continuously extracted from the source at a centroidal sampling point. The sample was transferred through a heated sample line to a continuous analyzer equipped with a flame ionization detector.

ANALYTICAL TECHNIQUE

All sample analysis were conducted following EPA methodology. A brief description follows for each method employed.

METHOD 5: DETERMINATION OF PARTICULATE EMISSIONS FROM STATIONARY SOURCES

Particulate catch was determined gravimetrically. The filter was oven conditioned at 350 deg-F. and weighed before and after sampling and the difference in weight determined the particulate filter catch. The probe and front half of the filter holder were washed with acetone. The probe wash catch was determined by the total solids in the wash minus the DI water blank. Total particulate catch was determined by the addition of the filter catch and the probe wash catch.

METHOD 6: DETERMINATION OF SULFUR DIOXIDE EMISSIONS FROM STATIONARY SOURCES

Sulfur dioxide concentration in the sample was determined by titration.

METHOD 7: DETERMINATION OF NITROGEN OXIDES EMISSIONS FROM STATIONARY SOURCES

All samples collected were analyzed at the laboratory using a continuous chemiluminescence analyzer. The analyzer was calibrated using as standards prepared by EPA protocol number 1, traceable to NBS standards.

METHOD 10: DETERMINATION OF CARBON MONOXIDE EMISSIONS FROM STATIONARY SOURCES

All samples collected were analyzed at the laboratory using a continuous nondispersive infrared analyzer. The analyzer was calibrated using gas standards prepared by EPA protocol number 1, traceable to NBS standards.

METHOD 25A: DETERMINATION OF TOTAL GASEOUS ORGANIC CONCENTRATION USING A FLAME IONIZATION ANALYZER

Total hydrocarbons were determined using a flame ionization analyzer. The analyzer was calibrated using gas standards prepared by EPA protocol number 1, traceable to NBS standards. Results are reported as volume concentration equivalents of the calibration gas, methane.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An improved hazardous waste disposal system for incinerating waste material while minimizing gaseous emissions generated during combustion comprising:

(a) a frame;

(b) a rotary kiln having a material inlet and a material outlet mounted on the frame and extending along the frame in a generally horizontal position, the kiln being inclined so that waste material is transported from the inlet to the outlet as the kiln rotates;

(c) primary burner means for elevating the temperature within the kiln for combustion of waste material, the burner means for atomizing fuel within the burner;

(d) a second frame separable from the first frame and adapted to connect to the first frame when the first frame and rotary kiln are generally horizontally positioned, and the second frame generally vertically positioned;

(e) a scrubbing tower carried by the second frame, and having an elongated vertical scrubber chamber that extends during use upwardly from the material outlet end portion of the kiln;

(f) secondary burner means for transferring heat to material and gases that exit the material outlet of the kiln;

(g) vane means for rotating air flow within the tower vertical chamber, about the vertical axis of the vertical chamber;

(h) a vertically spaced plurality of conical members placed in the vertical chamber above the vanes means, at least some of which are of variable diameter; and (i) liquid spray means for spraying water into the vertical chamber at a position above the conical members

2. The apparatus of claim 1 wherein there are a pair of secondary burners comprising the secondary burner means, and positioned on opposite sides of the rotary kiln material outlet.

3. The apparatus of claim 1 wherein the secondary burner means comprises means for atomizing burner fuel within the secondary burner means.

4. The apparatus of claim 1 wherein the primary burner means includes means for atomizing burner fuel and another second liquid within the primary burner means.

5. The apparatus of claim 4 wherein the second liquid is water.

6. The apparatus of claim 1 wherein the first frame carries an outlet chamber for receiving the products of combustion of the rotary kiln via the material outlet.

7. The apparatus of claim 6 wherein the second frame connects to the first frame above the outlet chamber.

8. The apparatus of claim 6 wherein the secondary burner means communicates with the outlet chamber.

9. The apparatus of claim 6 wherein the vane means is positioned at the top portion of the outlet chamber.

10. The apparatus of claim 1 wherein the vane means is a static vane assembly having a plurality of radial spaced apart vanes.

11. The apparatus of claim 10 wherein the vanes are affixed to a central hub and are circumferentially spaced about the hub.

12. The apparatus of claim 6 wherein there are multiple vane means including a first vane means at the top portion of the outlet and a second means positioned within the vertical scrubber chamber.

13. The apparatus of claim 12 wherein there are first and second pluralities of conical members positioned respectively above and below the second vane means.

14. The apparatus of claim 13 wherein liquid spray means positioned to spray water on each of conical members.

15. The apparatus of claim 14 wherein each plurality of conical members comprises multiple vertically spaced frustro conically shaped baffles of sequentially larger diameter so that water cascading off one cone falls on the top edge of the next cone underneath.

16. The apparatus of claim 15 wherein each plurality of conical members defines a cone surface area that extends substantially across the vertical scrubber chamber.

17. The apparatus of claim 14 further comprising transverse baffle means positioned at the top of the vertical scrubber chamber for limiting the amount of liquid material that exits the scrubber chamber.

18. A hazardous waste disposal system comprising:

(a) a rotary kiln;

(b) primary and secondary burner means for transferring intense heat respectively to the kiln at its inlet at discharge areas, at least one of the burners being an atomizer burner mixing air and fuel, and surrounded with venturi shaped shroud;

(c) material feed means for feeding hazardous waste material to the kiln;

(d) a generally upstanding, vertical scrubber stack for receiving gaseous and solid material discharged from the kiln;

(e) a plurality of vertically spaced spray heads positioned within the scrubber stack;

(f) a plurality of concentric, annular, vertically stacked cones disposed within the scrubber stack;

(g) a plurality of the spray heads positioned to spray fluid to the plurality of cones, so that water cascades from one cone to the next; and (h) the flow of gaseous material discharged from the kiln proceeding generally upwardly in the scrubber stack, at least some of the gaseous material flowing between the cones.

19. The apparatus of claim 18 wherein the rotary kiln has an axis of rotation that is inclined with respect to horizontal during operation.

20. The apparatus of claim 18 wherein the burner means includes venturi means for accelerating air flow through the burner means.

21. The apparatus of claim 18 wherein the material feed means comprises at least in part hydraulic ram means for forcing heavy hazardous waste material into the kiln.

22. The apparatus of claim 18 further comprising secondary burner means positioned at the lower end portion of the scrubber stack below the spray heads for transferring intense heat to the bottom end portion of the scrubber stack so that intense heat is maintained at the lower end portion of the scrubber stack adjacent the discharge end portion of the kiln.

23. The apparatus of claim 18 wherein the secondary burner means comprises in part a venturi section of the burner for increasing air speed through the burner.

24. The apparatus of claim 18 wherein the burner means comprises a burner mounted within a venturi shaped annular shroud, and means for feeding burner fuel to the burner at a controlled rate and means for forcing air through the venturi at a controlled rate during burning.

25. A hazardous waste disposal system comprising:

(a) a rotary kiln;

(b) burner means for transferring intense heat to the kiln and comprising a hollow venturi shaped shroud surrounding a burner head, means for injecting a burner fuel to the burner head at a controlled rate, and means for flowing air through the venturi shaped shroud;

(c) material feed means for continuously feeding hazardous waste material to the kiln;

(d) a generally upstanding, vertical scrubber stack for receiving material discharged from the kiln;

(e) a plurality of vertically spaced spray heads positioned within the scrubber stack;

(f) a plurality of concentric, annular, vertically stacked cones baffles disposed within the stack;

(g) each spray head directing a spray of fluid to the plurality of stacked baffles so that water cascades from one cone to the next;

(h) the flow of air from the kiln proceeding generally upwardly in the scrubber stack, at least some air flowing between the cones; and (i) secondary burner means positioned at the bottom of the scrubber stack for transferring intense heat to the gases and material entering the bottom of the scrubber stack from the kiln.

* * * * *